United States Patent
Xiong

(10) Patent No.: US 9,190,830 B1
(45) Date of Patent: Nov. 17, 2015

(54) OVERCURRENT PROTECTION CIRCUIT AND METHOD FOR AN LED DRIVER

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 373 days.

(21) Appl. No.: 13/874,931

(22) Filed: May 1, 2013

Related U.S. Application Data

(60) Provisional application No. 61/641,999, filed on May 3, 2012.

(51) Int. Cl.
*H05B 37/00* (2006.01)
*H02H 3/20* (2006.01)
*H05B 37/03* (2006.01)

(52) U.S. Cl.
CPC ............... *H02H 3/202* (2013.01); *H05B 37/03* (2013.01)

(58) Field of Classification Search
CPC .................................................... H05B 41/2855
USPC ........................................................... 315/127
See application file for complete search history.

(56) References Cited

U.S. PATENT DOCUMENTS

2002/0101193 A1* 8/2002 Farkas et al. ................... 315/291

* cited by examiner

*Primary Examiner* — Daniel Puentes
(74) *Attorney, Agent, or Firm* — Patterson Intellectual Property Law, P.C.; Mark J. Patterson

(57) ABSTRACT

A light fixture includes a ballast operable to drive a light source of the light fixture. The ballast includes a DC driver circuit and an output current limiting circuit. The output current limiting circuit is operable to minimize current overshoot in the event that an output of the ballast is shorted such as if the light source fails in a short circuit condition. The output current limiting circuit includes an output switch for limiting the current to the load (e.g., light source) and a control circuit. The control circuit senses the short circuit and clearing of the short circuit and controls the output switch accordingly to prevent excess output current to the shorted circuited load.

19 Claims, 1 Drawing Sheet

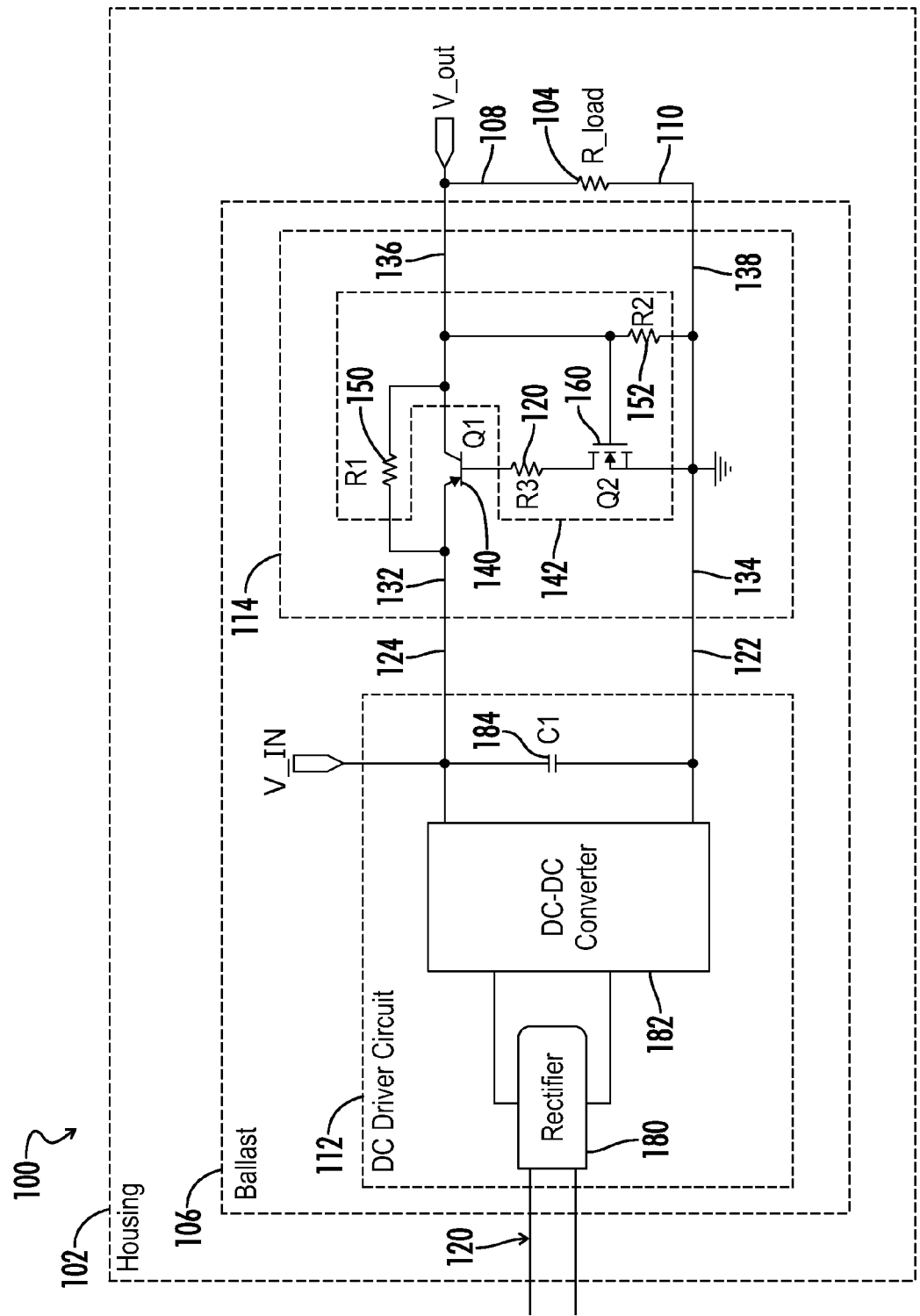

OVERCURRENT PROTECTION CIRCUIT AND METHOD FOR AN LED DRIVER

CROSS-REFERENCES TO RELATED APPLICATIONS

This application claims priority to and benefit of U.S. Provisional Patent Application Ser. No. 61/641,999 filed May 3, 2012, entitled "METHOD TO PROTECT OVERCURRENT FROM OUTPUT SHORT CIRCUIT" which is incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to protecting direct current (DC) driver circuits from output faults (e.g., short circuits). More particularly, this invention pertains to circuits and methods for output current in response to a short circuit at the output of and LED driver circuit.

Compared to incandescent lamps and fluorescent lamps, light emitting diode (LED) lighting has a longer useful life and superior dimming capability. That is, dimming an LED light source will not affect the life span of the LED light source. Thus, as the cost of LED lighting decreases, LED lighting is becoming the lighting of choice for many applications.

LED light sources are driven by DC driver circuits, usually constant current DC driver circuits. Underwriters' Laboratories (UL) defines a CLASS-2 LED driver circuit as being isolated with a maximum output voltage of 60V and a maximum output current of 8 A at all times. DC driver circuits operating near the UL CLASS-2 limits typically overshoot or even consistently exceed the 8 A current limitation of UL CLASS-2 LED drivers when the output is shorted to simulate an improperly connected load or a properly connected LED light source shorting out at the end of its useful life. Therefore, there is a need for a reliable circuit to effectively control the output current of an LED driver circuit in a manner that conforms to industry standards.

BRIEF SUMMARY OF THE INVENTION

Aspects of the present invention provide an output current limiting circuit to quickly react to a shorted output by limiting and substantially eliminating output current until the shorted output condition is corrected.

In one aspect, an output current limiting circuit limits an output current of a direct current (DC) driver circuit. The DC driver circuit provides power to a load. The output current limiting circuit includes a positive input terminal, a ground input terminal, a positive output terminal, a ground output terminal, and output switch, and a control circuit. The positive input terminal connects to a positive lead of the DC driver circuit. The ground input terminal connects to a ground lead of the DC driver circuit. The positive output terminal connects to a first load terminal. The ground output terminal connects to a second load terminal. The output switch is connected between the positive input terminal and the positive output terminal. The output switch provides a low resistance current path from the positive input terminal to the positive output terminal when closed and substantially prevents current flow from the positive input terminal to the positive output terminal when open. The control circuit is connected to a control terminal of the output switch and senses an output voltage between the positive output terminal and the ground output terminal. The control circuit is closes the output switch via the control terminal of the output switch when the output voltage exceeds a predetermined voltage limit. The control circuit opens the output switch via the control terminal of the output switch from the output voltage is less than or equal to the predetermined voltage limit.

In another aspect, a ballast is operable to provide power to a light source from a power source. The ballast includes a direct current (DC) driver circuit and an output current limiting circuit. The DC driver circuit receives power from the power source and provides a predetermined amount of DC power to the light source. The DC driver circuit includes input terminals, a ground lead, and a positive lead. The positive lead and the ground lead cooperate to provide the predetermined amount DC power. The output current limiting circuit limits an output current of the DC driver circuit. The output current limiting circuit includes a positive input terminal, a ground input terminal, a positive output terminal, a ground output terminal, and output switch, and a control circuit. The positive input terminal is connected to a positive lead of the DC driver circuit. The ground input terminal is connected to a ground lead of the DC driver circuit. The positive output terminal is connected to a first load terminal of the light source. The ground output terminal is connected to a second load terminal of the light source. The output switch is connected between the positive input terminal and the positive output terminal. The output switch provides a low resistance current path from the positive input terminal to the positive output terminal when closed and substantially prevents current flow from the positive input terminal to the positive output terminal when open. The control circuit is connected to a control terminal of the output switch and senses an output voltage between the positive output terminal and the ground output terminal. The control circuit closes the output switch via the control terminal of the output switch when the output voltage exceeds a predetermined voltage limit. The control circuit opens the output switch via the control terminal of the output switch from the output voltage is less than or equal to the predetermined voltage limit.

In another aspect, a light fixture receives power from an alternating current (AC) power line and provides light. The light fixture includes a housing, a light source, and a ballast. The light source is supported by the housing and includes a first load terminal and a second load terminal. The light source provides light in response to receiving DC power. The ballast is supported by the housing and provides power to the light source from the AC power line. The ballast includes a direct current (DC) driver circuit and an output current limiting circuit. The DC driver circuit receives power from the AC power line and provides a predetermined amount of DC power to the light source. The DC driver circuit includes input terminals, a ground lead, and a positive lead. The positive lead and the ground lead cooperate to provide the predetermined amount DC power. The output current limiting circuit limits an output current of the DC driver circuit. The output current limiting circuit includes a positive input terminal, a ground input terminal, a positive output terminal, a ground output terminal, and output switch, and a control circuit. The positive input terminal connects to a positive lead of the DC driver circuit. The ground input terminal connects to a ground lead of the DC driver circuit. The positive output terminal is connected to the first load terminal of the light source. The ground output terminal is connected to the second load terminal of the light source. The output switch is connected between the positive input terminal and the positive output terminal. The output switch provides a low resistance current path from the positive input terminal to the positive output terminal when closed and substantially prevents current flow from the positive input terminal to the positive output terminal when open. The control circuit is connected to a control terminal of the output switch and senses an output voltage between the positive output terminal and the ground output terminal. The control circuit closes the output switch via the control terminal of the output switch when the output voltage exceeds a predetermined voltage limit. The control circuit opens the output switch via the control terminal of the output switch from the output voltage is less than or equal to the predetermined voltage limit.

BRIEF DESCRIPTION OF THE SEVERAL VIEWS OF THE DRAWINGS

FIG. 1 is a schematic diagram of a light fixture, ballast, and output current limiting circuit according to one embodiment of the present invention Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids.

Referring to FIG. 1, a light fixture 100 receives power from an alternating current (AC) power line and provides illumination. The light fixture 100 includes a housing 102, a light source 104, and a ballast 106. The light source 104 is supported by the housing 102 and includes a first load terminal 108 and a second load terminal 110. The light source 104 provides light in response to receiving DC power. In an embodiment, the light source 104 may be one or more light emitting diodes (LED). The ballast 106 is supported by the housing 102 and is provides power to the light source 104 from a power source (e.g. the AC line power). The ballast 106 includes a direct current (DC) driver circuit 112 and an output current limiting circuit 114.

The DC driver circuit 112 receives power from the AC power line i.e., power source) and provide a predetermined amount of DC power to a load (e.g., light source 104). The DC driver circuit 112 includes input terminals 120 configured to connect to the AC power line, a ground bus or lead 122, and a positive bus or lead 124. The positive lead 124 and the ground lead 122 cooperate to provide the predetermined amount of DC power from the DC driver circuit 112 to the load 104.

The output current limiting circuit 114 functions to limit an output current of the DC driver circuit 112. The output current limiting circuit 114 connects between the DC driver circuit 112 and the load (e.g., light source 104). The output current limiting circuit 114 includes a positive input terminal 132, a ground input terminal 134, a positive output terminal 136, a ground output terminal 138, an output switch 140, and a control circuit 142. The positive input terminal 132 is connected to the positive lead 124 of the DC driver circuit 112. The ground input terminal 134 is connected to the ground lead 122 of the DC driver circuit 112. The positive output terminal 136 is connected to the first load terminal 108 of the light source 104. The ground output terminal 138 is connected to the second load terminal 110 of the light source 104. In one embodiment, the ground input terminal 134 and the ground output terminal 138 of the output current limiting circuit 114 may be a single ground terminal connected to the ground lead 122 of the DC driver circuit 112.

The output switch 140 is connected between the positive input terminal 132 and the positive output terminal 136. The output switch 140 is controllable to provide a low resistance current path from the positive input terminal 132 to the positive output terminal 136 when closed. The output switch 140 is further controllable to substantially prevent current flow from the positive input terminal 132 to the positive output terminal 136 when open.

The control circuit 142 is connected to a control terminal of the output switch 140. The control circuit 142 senses an output voltage between the positive output terminal 136 and the ground output terminal 138. The control circuit 142 closes the output switch 140 via a control terminal of the output switch 140 when the output voltage exceeds a predetermined voltage limit. The control circuit 142 opens the output switch 140 via the control terminal of the output switch 140 when the output voltage is less than or equal to the predetermined voltage limit.

In one embodiment, the control circuit 142 includes a voltage divider that provides a test current from the positive input terminal 132 to the positive output terminal 136. The voltage divider includes a first resistor 150 and a second resistor 152. The first resistor 150 is connected between the positive input terminal 132 and the positive output terminal 136 of the output current limiting circuit 114. The second resistor 152 is connected between the positive output terminal 136 and the ground output terminal 138.

In one embodiment, the output switch 140 of the output current limiting circuit 114 is a PNP transistor having a base, a collector, and an emitter. The control terminal of the output switch 140 is the base of the PNP transistor. The emitter of the PNP transistor is connected to the positive input terminal 132. The collector of the PNP transistors connected to the positive output terminal 136. The control circuit 142 includes a control switch 160 connected between the control terminal of the output switch 140 and the ground input terminal 134 of the output current limiting circuit 114. A control terminal of the control switch 160 is connected to the positive output terminal 136. The control circuit 142 may also include current limiting resistor 120 connected between the control switch 160 and the base of the PNP transistor 142 to limit current from the base of the PNP transistor. In this embodiment, the maximum current supplied to the load 104 by the current limiting output circuit 114 is given by Equation 1, wherein VIN is the voltage between positive input terminal 132 and ground input terminal 134, $@_{Q1}$ is the gain of the PNP transistor of the output switch 140, and R3 is the resistance of the current limiting resistor 120. For purposes of Equation 1, current through the first resistor 150 and the second resistor 152 may be disregarded due to the relatively high resistances of the first resistor 150 and the second resistor 152.

$$I_{max\_load} = \beta_{Q1} \cdot \frac{V_{IN} - 0.7}{R3} \qquad \text{Equation 1}$$

In operation, a shorted output (i.e., a near zero resistance load 104) pulls down the output voltage of the output current limiting circuit 114 (i.e., the voltage at the positive output terminal 136). When the output voltage drops below the turn on voltage of the control switch 160, the control switch 160 opens, which substantially eliminates current from the base of the PNP transistor of the output switch 140. Thus, the output switch 140 ceases to conduct current from the positive input terminal 132 to the positive output terminal 136 of the output current limiting circuit 114. The first resistor 150 provides a test current such that when the resistance of the load 104 increases (i.e., the short-circuit condition is corrected), the output voltage at the positive output terminal 136 of the output current limiting circuit 114 increases from near zero to the voltage of the positive lead 124 of the DC driver circuit 112. This continues until the output voltage at the positive output terminal 136 of the output current limiting circuit 114 exceeds the turn on voltage of the control switch 160. The control switch 160 is thus turned back on, the control switch 160 conducts current from the base of the PNP transistor of the output switch 140, and the output switch 140 again provides a low resistance current path from the positive input terminal 132 to the positive output terminal 136 of the output current limiting circuit 114.

In one embodiment, the DC driver circuit 112 further includes a rectifier 180, a DC to DC converter 182, and an output capacitor 184. The rectifier 180 receives power from the AC power line via the input terminals 120 of the DC driver circuit 112 and provides DC power (i.e., rectified AC line power). The DC to DC converter 182 is connected to the rectifier 180. The DC to DC converter 182 receives the provided DC power from the rectifier 180 and provides the predetermined amount of DC power to the output current limiting circuit 114 via the positive lead 124 and the ground lead 122 of the DC driver circuit 112. The DC to DC converter 182 may be a constant voltage type or constant current type DC to DC converter. The output capacitor 184 is connected between the positive lead 124 and the ground lead 122 of the DC driver circuit 112 and functions to smooth the voltage of the provided predetermined amount of DC power from the DC to DC converter 182.

The light source 104 may include any arrangement of light emitting devices (e.g., light emitting diodes). In one embodiment, the light source 104 includes a plurality of series connected light emitting diodes.

It is contemplated that the output current limiting circuit 114 as disclosed herein may be used in applications other than lighting fixtures and to limit output currents to loads other than light sources within the scope of the claims.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful OVERCURRENT PROTECTION CIRCUIT AND METHOD FOR AN LED DRIVER, it is not intended that such references be construed as limitations upon the scope of this invention except as set forth in the following claims.

What is claimed is:

1. A current limiting circuit for a direct current (DC) driver circuit, wherein the DC driver circuit includes a positive lead and a ground lead and is operable to provide power to a load connected to first and second load terminals, the current limiting circuit comprising:
a positive input terminal configured to connect to the positive lead of the DC driver circuit;
a ground input terminal configured to connect to a ground lead of the DC driver circuit;
a positive output terminal configured to connect to the first load terminal;
a ground output terminal configured to connect to the second load terminal;
an output switch connected between the positive input terminal and the positive output terminal, the output switch comprising a control terminal and operable to provide a low resistance current path from the positive input terminal to the positive output terminal when closed and to substantially prevent current flow from the positive input terminal to the positive output terminal when open;
a control circuit connected to the control terminal of the output switch, wherein the control circuit is effective to sense an output voltage between the positive output terminal and the ground output terminal;
close the output switch via the control terminal of the output switch when the output voltage exceeds a predetermined voltage limit; and
open the output switch via the control terminal of the output switch when the output voltage is less than or equal to the predetermined voltage limit.

2. The current limiting circuit of claim 1, wherein the control circuit comprises a voltage divider configured to provide a test current from the positive input terminal to the positive output terminal, the voltage divider comprising:
a first resistor connected between the positive input terminal and the positive output terminal; and
a second resistor connected between the positive output terminal and the ground output terminal.

3. The current limiting circuit of claim 1, wherein the ground input terminal and the ground output terminal are a single ground terminal configured to connect to the ground lead of the DC driver circuit and to the second load terminal.

4. The current limiting circuit of claim 1, wherein the control circuit comprises a control switch connected between the control terminal of the output switch and the ground input terminal, the control switch having a control terminal connected to the positive output terminal.

5. The current limiting circuit of claim 1, wherein:
the output switch comprises a PNP transistor having a base, a collector, and an emitter;
the control terminal of the output switch is the base of the PNP transistor;
the emitter of the PNP transistor is connected to the positive input terminal;
the collector of the PNP transistor is connected to the positive output terminal;
the control circuit comprises a control switch connected between the control terminal of the output switch and the ground input terminal, the control switch having a control terminal connected to the positive output terminal; and
the control circuit further comprises a current limiting resistor connected between the control switch and the base of the PNP transistor.

6. A ballast operable to provide power to a light source from a power source, the ballast comprising:
a direct current (DC) driver circuit operable to receive power from a power source and provide a predetermined amount of DC power to the light source, the DC driver circuit comprising
input terminals configured to connect to the power source,
a ground lead,
a positive lead configured to provide the predetermined amount of DC power in cooperation with the ground lead; and
an output current limiting circuit operable to limit an output current of the DC driver circuit, the output current limiting circuit comprising
a positive input terminal connected to the positive lead of the DC driver circuit,
a ground input terminal connected to the ground lead of the DC driver circuit,
a positive output terminal configured to connect to a first load terminal of the light source,
a ground output terminal configured to connect to a second load terminal of the light source,
an output switch connected between the positive input terminal and the positive output terminal, the output switch operable to provide a low resistance current path from the positive input terminal to the positive output terminal when closed and to substantially prevent current flow from the positive input terminal to the positive output terminal when open, a control circuit connected to a control terminal of the output switch, wherein the control circuit is effective to sense an output voltage between the positive output terminal and the ground output terminal;

close the output switch via the control terminal of the output switch when the output voltage exceeds a predetermined voltage limit; and open the output switch via the control terminal of the output switch when the output voltage is less than or equal to the predetermined voltage limit.

7. The ballast of claim 6, wherein the control circuit comprises a voltage divider configured to provide a test current from the positive input terminal to the positive output terminal, the voltage divider comprising a first resistor connected between the positive input terminal and the positive output terminal of the output current limiting circuit, and a second resistor connected between the positive output terminal and the ground output terminal of the output current limiting circuit.

8. The ballast of claim 6, wherein the ground input terminal and the ground output terminal of the output current limiting circuit comprise a single ground terminal connected to the ground lead of the DC driver circuit.

9. The ballast of claim 6, wherein the control circuit comprises a control switch connected between the control terminal of the output switch and the ground input terminal of the output current limiting circuit, the control switch having a control terminal connected to the positive output terminal of the output current limiting circuit.

10. The ballast of claim 6, wherein:

the output switch of the output current limiting circuit is a PNP transistor having a base, a collector, and an emitter;

the control terminal of the output switch is the base of the PNP transistor;

the emitter of the PNP transistor is connected to the positive input terminal;

the collector of the PNP transistor is connected to the positive output terminal;

the control circuit of the output current limiting circuit comprises a control switch connected between the control terminal of the output switch and the ground input terminal, the control switch having a control terminal connected to the positive output terminal; and the control circuit further comprises a current limiting resistor connected between the control switch and the base of the PNP transistor.

11. The ballast of claim 6, wherein the power source is an AC power line and the DC driver circuit further comprises:

a rectifier operable to receive power from the AC power line via the input terminals of the DC driver circuit and provide DC power; and a DC to DC converter connected to the rectifier, wherein the DC to DC converter is operable to receive the provided DC power from the rectifier and provide the predetermined amount of DC power to the output current limiting circuit via the positive lead and the ground lead of the DC driver circuit.

12. A light fixture operable to receive power from an alternating current (AC) power line and provide light, the light fixture comprising:

a housing;

a light source supported by the housing, the light source having a first load terminal and a second load terminal, wherein the light source is operable to provide light in response to receiving DC power;

a ballast supported by the housing, the ballast operable to provide power to the light source from the AC power line, wherein the ballast comprises a direct current (DC) driver circuit operable to receive power from the AC power line and provide a predetermined amount of DC power to the light source, the DC driver circuit comprising input terminals configured to connect to the AC power line;

a ground lead, a positive lead configured to provide the predetermined amount of DC power in cooperation with the ground lead, and an output current limiting circuit operable to limit an output current of the DC driver circuit, the output current limiting circuit comprising a positive input terminal connected to the positive lead of the DC driver circuit, a ground input terminal connected to the ground lead of the DC driver circuit, a positive output terminal connected to the first load terminal of the light source, a ground output terminal connected to the second load terminal of the light source, an output switch connected between the positive input terminal and the positive output terminal, the output switch operable to provide a low resistance current path from the positive input terminal to the positive output terminal when closed and substantially prevent current flow from the positive input terminal to the positive output terminal when open, a control circuit connected to a control terminal of the output switch, wherein the control circuit is operable to sense an output voltage between the positive output terminal and the ground output terminal, close the output switch via the control terminal of the output switch when the output voltage exceeds a predetermined voltage limit, and open the output switch via the control terminal of the output switch when the output voltage is less than or equal to the predetermined voltage limit.

13. The light fixture of claim 12, wherein the control circuit comprises a voltage divider configured to provide a test current from the positive input terminal to the positive output terminal, the voltage divider comprising:

a first resistor connected between the positive input terminal and the positive output terminal of the output current limiting circuit; and a second resistor connected between the positive output terminal and the ground output terminal of the output current limiting circuit.

14. The light fixture of claim 12, wherein the ground input terminal and the ground output terminal of the output current limiting circuit are a single ground terminal connected to the ground lead of the DC driver circuit.

15. The light fixture of claim 12, wherein the control circuit comprises a control switch connected between the control terminal of the output switch and the ground input terminal of the output current limiting circuit, the control switch having a control terminal connected to the positive output terminal of the output current limiting circuit.

16. The light fixture of claim 12, wherein:

the output switch of the output current limiting circuit is a PNP transistor having a base, a collector, and an emitter;

the control terminal of the output switch is the base of the PNP transistor;

the emitter of the PNP transistor is connected to the positive input terminal;

the collector of the PNP transistor is connected to the positive output terminal;

the control circuit of the output current limiting circuit comprises a control switch connected between the control terminal of the output switch and the ground input terminal, the control switch having a control terminal connected to the positive output terminal; and the control circuit further comprises a current limiting resistor connected between the control switch and the base of the PNP transistor.

17. The light fixture of claim 12, wherein the DC driver circuit further comprises:

a rectifier operable to receive power from the AC power line via the input terminals of the DC driver circuit and provide DC power; and a DC to DC converter connected to the rectifier, wherein the DC to DC converter is operable to receive the provided DC power from the rectifier and provide the predetermined amount of DC power to the output current limiting circuit via the positive lead and the ground lead of the DC driver circuit.

18. The light fixture of claim 12, wherein the light source comprises a plurality of series connected light emitting diodes.

19. The light fixture of claim 12, wherein the output current limiting circuit further comprises a first resistor connected between the positive input terminal of the output current limiting circuit and the positive output of the output current limiting circuit, substantially in parallel with the output switch, wherein the first resistor is configured to provide a test current such that the control circuit can determine whether a short between the positive output terminal of the output current limiting circuit and the ground output terminal of the output current limiting circuit has been removed.

* * * * *